United States Patent
Wen

(10) Patent No.: US 10,235,267 B2
(45) Date of Patent: Mar. 19, 2019

(54) ONLINE TESTING SYSTEM AND METHOD THEREOF

(71) Applicant: MOLBASE (Shanghai) Biotechnology Co., Ltd., Shanghai (CN)

(72) Inventor: Jun Wen, Shanghai (CN)

(73) Assignee: MOLBASE (SHANGHAI) BIOTECHNOLOGY CO., LTD., Shanghai (CN)

( * ) Notice: Subject to any disclaimer, the term of this patent is extended or adjusted under 35 U.S.C. 154(b) by 130 days.

(21) Appl. No.: 14/861,406

(22) Filed: Sep. 22, 2015

(65) Prior Publication Data

US 2017/0048338 A1 Feb. 16, 2017

Related U.S. Application Data

(60) Provisional application No. 62/204,901, filed on Aug. 13, 2015.

(51) Int. Cl.
  *G06F 9/44* (2018.01)
  *G06F 11/36* (2006.01)
(52) U.S. Cl.
  CPC ...... *G06F 11/3612* (2013.01); *G06F 11/3688* (2013.01); *G06F 11/3692* (2013.01)
(58) Field of Classification Search
  CPC ............. G06F 11/3612; G06F 11/3688; G06F 11/3692
  See application file for complete search history.

(56) References Cited

U.S. PATENT DOCUMENTS

| | | | | |
|---|---|---|---|---|
| 2006/0162071 A1* | 7/2006 | Dixon | ............. | G06Q 30/02 5/93.1 |
| 2007/0271511 A1* | 11/2007 | Khopkar | ............. | G06F 17/212 715/234 |
| 2011/0016461 A1* | 1/2011 | Bankston | ............. | G06F 8/65 717/170 |
| 2014/0280473 A1* | 9/2014 | Stroomer | ............. | H04L 67/1027 709/203 |
| 2014/0310691 A1* | 10/2014 | Ou | ............. | G06F 11/368 717/124 |
| 2015/0106156 A1* | 4/2015 | Chang | ............. | G06Q 30/0201 705/7.29 |
| 2016/0241572 A1* | 8/2016 | Muhlestein | ............. | H04L 63/145 |

* cited by examiner

*Primary Examiner* — Hanh Thi-Minh Bui
(74) *Attorney, Agent, or Firm* — Muncy, Geissler, Olds & Lowe, P.C.

(57) ABSTRACT

An online testing system and a method thereof, where the system includes a server, a front-end dispatcher, a monitoring module, and a data analyzing module. The method allows multiple versions to be tested at the same time period. During different users' visits, different versions are randomly tested, so as to collect the user data for each of the versions for comparison, thereby achieving analysis on user behavior in a more rapid and more comprehensive way. In the process of product release, the method uses the front-end dispatcher to gradually make the new product available to users by gradually increasing the traffic, while performing real-time monitoring on operational record, so as to detect any potential problems at the earliest possible moment, thereby having the last opportunity to fix any potential quality problems of the product before they have large-scale impact on more users.

5 Claims, 1 Drawing Sheet

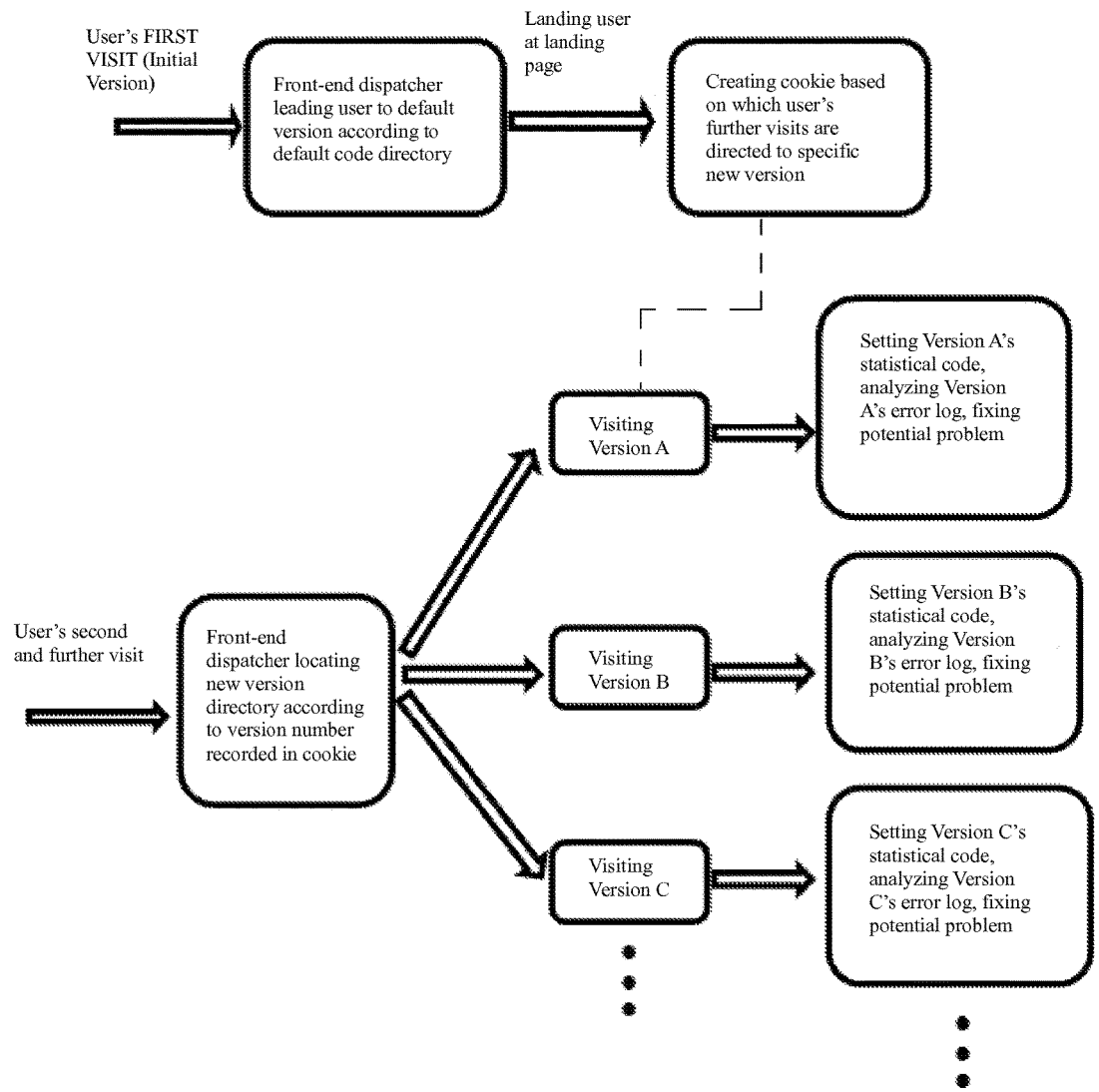

ONLINE TESTING SYSTEM AND METHOD THEREOF

BACKGROUND OF THE INVENTION

1. Technical Field

The present invention relates to the Internet, and more particularly to a system and a method for testing a product online before the product's full release.

2. Description of Related Art

In the changing Internet world, how fast a product is developed to launch determines not only success or failure of the product, but also the future of the company working on this product. In this process, testing is crucial for product quality and further improvement. Testing is repeatedly conducted throughout the life cycle of a product, from development, launch to full operation. While tests for the stage of development are typically designed with great exactness, those for other stages such as launch and full operation are less supported with data necessary for good code quality.

A/B testing is an emerging method for optimizing web pages. It contributes to optimal webpage indicators such as conversion rates and registration rates. For implementing A/B testing, the first step is to create a variation page. This page is different from a control page at, for example, the font of titles, the color of background or wording. Then the two pages are randomly pushed to all users having browse. By comparing the users' conversion rates for the two pages, which design is more preferred would be clear. However, the traditional A/B testing approach only provides information about how much users like two different versions.

SUMMARY OF THE INVENTION

The present invention provides an online testing system, which is used to test different versions of a product before the product's full release, so as to have a last opportunity to fix any potential problems before the full release.

The first objective of the present invention is to provide an online testing system, which comprising:
- a server, in which codes of multiple versions to be tested are configured, wherein each of the versions is complete and capable of operating independently;
- a front-end dispatcher, performing traffic direction so that a small part of users is directed to the new version and the rest of the users are directed to the old version;
- a monitoring module, monitoring operation of each said version in a real-time manner and recording visit data of each said version; and
- a data analyzing module, analyzing the visit data of each said version.

In the foregoing an online testing system, the data analyzing module is realized using Google Analytics.

The second objective of the present invention is to provide an online testing method, which is performed using the foregoing online testing system and at least comprises the following steps:
(1) releasing codes of multiple versions to be tested to different directories through a releasing system;
(2) at a user's first visit, setting one of the versions as a default version, to which a root directory of a front-end dispatcher is located;
(3) providing a consolidated landing page, in which a weight for each said version is configured;
(4) obtaining a version number corresponding to the user's present visit by referring to the weight configured;
(5) writing the version number obtained into a cookie so that the user's following visits will be all directed to the version marked in the cookie;
(6) setting a testing cycle by configuring the cookie's expiration date;
(7) for the user's second and further visits, where the front-end dispatcher determines the version number exists in the cookie, always directing the user to the version corresponding to the version number;
(8) monitoring the user's visiting behavior in a real-time manner using a monitoring module and recording visit data;
(9) analyzing the visit data of each said version; and
(10) generating error logs for the versions through analysis and fixing any potential problems before full release.

In the foregoing an online testing method, the Step (8) further comprises: configuring a unique statistical code for each said version, and consolidating all users' visit data into the statistical code of each said version.

To sum up, the present invention allows multiple versions to be tested at the same time period. During different users' visits, different versions are randomly tested, so as to collect the user data for each of the versions for comparison, thereby achieving analysis on user behavior in a more rapid and more comprehensive way.

In the process of product release, the method uses the front-end dispatcher to gradually make the new product available to users by gradually increasing the traffic, while performing real-time monitoring on operational record, so as to detect any potential problems at the earliest possible moment, thereby having the last opportunity to fix any potential quality problems of the product before they have large-scale impact on more users.

BRIEF DESCRIPTION OF THE DRAWING

The FIGURE is a flowchart of an online testing system and its method according to the present invention.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawing.

Referring to the FIGURE, the present invention provides an online testing system that comprises: a server, a front-end dispatcher, a monitoring module, and a data analyzing module.

In the server, codes of multiple versions to be tested are configured.

The front-end dispatcher performs traffic direction so that a small part of users is directed to the new version and the rest of the users are directed to the old version.

The monitoring module monitors operation of each said version in a real-time manner and recording visit data of each said version.

The data analyzing module analyzes the visit data of each said version, wherein the data analyzing module may be realized using Google Analytics.

According to the present invention, the codes of multiple versions are simultaneously deployed on the server end. Each of the versions is complete and capable of operating independently. When the new code versions have been launched online, users are not directed to the new code versions immediately. Instead, with the traffic direction performed by the front-end dispatcher, a small part of users is led to the new versions and the rest of the users still land on the old version. The portion for new versions is then increased gradually until all of the users' visits are directed to the new versions.

The present invention provides an online testing method, which is performed using the foregoing online testing system. The method at least comprises the following steps.

In Step (1), codes of multiple versions to be tested are released to different directories through a releasing system.

In Step (2), at a user's first visit, one of the versions is set as a default version, to which a root directory of a front-end dispatcher is located.

In Step (3), a consolidated landing page is provided. Weights for the versions are configured in the page. For example, there are three versions, namely A, B and C. A weight for Version A is 10%, for Version B is 20%, and for Version C is 70%.

In Step (4), a version number corresponding to the user's present visit is obtained by referring to the weight configured.

In Step (5), the version number obtained is written into a cookie so that the user's following visits will be all directed to the version marked in the cookie.

In Step (6), a testing cycle is set by configuring the cookie's expiration date.

In Step (7), for the user's second and further visits, where the front-end dispatcher determines the version number exists in the cookie, the user will be always directed to the version corresponding to the version number.

In Step (8), a unique statistical code is configured for each said version. The user's visiting behavior is monitored in a real-time manner using a monitoring module and recording visit data. All users' visit data are consolidated into the statistical code of each said version.

In Step (9), the visit data of each said version are analyzed.

In Step (10), error logs are generated for the versions through analysis and fixing any potential problems before full release.

The present invention allows multiple versions to be tested at the same time period. During different users' visits, different versions are randomly tested, so as to collect the user data for each of the versions for comparison, thereby achieving analysis on user behavior in a more rapid and more comprehensive way.

In the process of product release, the method uses the front-end dispatcher to gradually make the new product available to users by gradually increasing the traffic, while performing real-time monitoring on operational record, so as to detect any potential problems at the earliest possible moment, thereby having the last opportunity to fix any potential quality problems of the product before they have large-scale impact on more users.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An online testing system, comprising:
    a server, in which codes of new and old versions of a webpage to be tested are configured, wherein the versions are complete and capable of operating independently;
    a front-end dispatcher, performing traffic direction so that when users access the webpage, a small part of the users is directed to the new version and the rest of the users are directed to the old version;
    a monitoring module, monitoring operation of each said version in a real-time manner and recording visit data of each said version; and
    a data analyzing module, analyzing the visit data of each said version, wherein the front-end dispatcher changes the traffic direction so that a number of the users accessing the webpage and being directed to the new version is gradually increased based on the visit data until all of the users' visits are directed to the new version, wherein
    at a user's first visit, one of the new and old versions is set as a default version, to which a root directory of a front-end dispatcher is located,
    a consolidated landing page, in which a weight for each said version is configured, is provided,
    a version number corresponding to the user's present visit is obtained by referring to the weight configured,
    writing the version number obtained is written into a cookie so that the user's following visits will be all directed to the version marked in the cookie, and
    for the user's second and further visits, where the front-end dispatcher determines the version number exists in the cookie, the user is always directed to the version corresponding to the version number.

2. The online testing system of claim 1, wherein the data analyzing module is realized using Google Analytics.

3. An online testing method using the online testing system comprising:
    a server, in which codes of new and old versions of a webpage to be tested are configured, wherein the versions are complete and capable of operating independently;
    a front-end dispatcher, performing traffic direction so that when users access the webpage, a small part of the users is directed to the new version and the rest of the users are directed to the old version;
    a monitoring module, monitoring operation of each said version in a real-time manner and recording visit data of each said version; and
    a data analyzing module, analyzing the visit data of each said version, wherein the front-end dispatcher changes the traffic direction so that a number of the users accessing the webpage and being directed to the new version is gradually increased based on the visit data until all of the users' visits are directed to the new version, the method at least comprising the following steps:
    at a user's first visit, setting one of the new and old versions as a default version, to which a root directory of a front-end dispatcher is located;
    providing a consolidated landing page, in which a weight for each said version is configured;
    obtaining a version number corresponding to the user's present visit by referring to the weight configured;

writing the version number obtained into a cookie so that the user's following visits will be all directed to the version marked in the cookie; and for the user's second and further visits, where the front-end dispatcher determines the version number exists in the cookie, always directing the user to the version corresponding to the version number.

4. The online testing method of claim 3, further comprising:

releasing codes of new and old versions of a webpage to be tested to different directories through a releasing system such that users accessing the webpage are directed to either one of the new and old versions of the webpage;

setting a testing cycle by configuring the cookie's expiration date;

monitoring the user's visiting behavior in a real-time manner using a monitoring module and recording visit data;

analyzing the visit data of each said version; and generating error logs for the versions through analysis and fixing any potential problems before full release, wherein a number of the users accessing the webpage and being directed to the new version is gradually increased based on the visit data until all of the users visits are directed to the new version.

5. The online testing method of claim 4, wherein monitoring the user's visiting behavior further comprises: configuring a unique statistical code for each said version, and consolidating all users' visit data into the statistical code of each said version.

* * * * *